United States Patent [19]

Okuda et al.

[11] Patent Number: 4,891,944
[45] Date of Patent: Jan. 9, 1990

[54] HYDRAULICALLY OPERATED CONTINUOUSLY VARIABLE TRANSMISSION

[75] Inventors: Akihito Okuda; Yoshihiro Katagiri; Eiichiro Kawahara; Kenichi Ikejiri, all of Saitama, Japan

[73] Assignee: Honda Giken Kogyo Kabushiki Kaisha, Tokyo, Japan

[21] Appl. No.: 132,481

[22] Filed: Dec. 14, 1987

[30] Foreign Application Priority Data

Dec. 12, 1986 [JP] Japan ................. 61-296241

[51] Int. Cl.⁴ .............................. F16D 39/00
[52] U.S. Cl. ........................ 60/489; 60/487; 60/488
[58] Field of Search ............ 91/499; 60/487–492

[56] References Cited

U.S. PATENT DOCUMENTS

| | | |
|---|---|---|
| 2,777,286 | 1/1957 | Badalini . |
| 3,364,679 | 1/1968 | Osojnak . |
| 3,364,680 | 1/1968 | Osojnak . |
| 3,416,312 | 12/1968 | Margolin . |
| 3,464,206 | 9/1969 | Badalini . |
| 3,890,883 | 6/1975 | Rometsch et al. ............ 91/499 |
| 4,444,093 | 4/1984 | Koga . |
| 4,478,134 | 10/1984 | Kawahara et al. ............ 91/488 |
| 4,550,645 | 11/1985 | Beck . |
| 4,646,520 | 3/1987 | Furumoto . |

FOREIGN PATENT DOCUMENTS

| | | |
|---|---|---|
| 231526 | 4/1958 | Australia . |
| 32-7159 | 9/1957 | Japan . |
| 41-3208 | 3/1966 | Japan . |
| 57-70968 | 5/1982 | Japan . |
| 57-76357 | 5/1982 | Japan . |
| 59-38467 | 9/1984 | Japan . |

Primary Examiner—Edward K. Look
Attorney, Agent, or Firm—Lyon & Lyon

[57] ABSTRACT

A hydraulically operated continuously variable transmission comprises a hydraulic motor coupled to an output shaft, a hydraulic pump coupled an input shaft, and a closed hydraulic circuit interconnecting the hydraulic motor and the hydraulic pump. The hydraulic motor has an annular array of slidable motor plungers disposed around an axis of rotation thereof and slidably disposed in respective cylinder holes defined in the motor cylinder. The hydraulic motor also has a distribution ring supported on the fixed shaft and rotatable relatively to and slidable against an end face of the motor cylinder for introducing high-pressure oil successively into the cylinder holes and discharging oil successively from the cylinder holes in response to rotation of the motor cylinder. The transmission also includes a hydraulic pump coupled to an input shaft, at least one of the hydraulic pump and the hydraulic motor being of the variable-displacement type, and a closed hydraulic circuit interconnecting the hydraulic pump and the hydraulic motor. The distribution ring is held in engagement with the fixed shaft for preventing the distribution ring from rotating with respect to the fixed shaft.

12 Claims, 4 Drawing Sheets

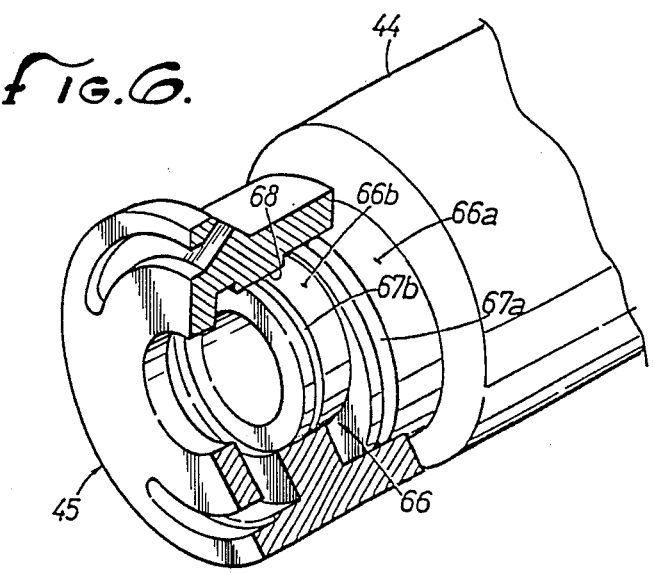
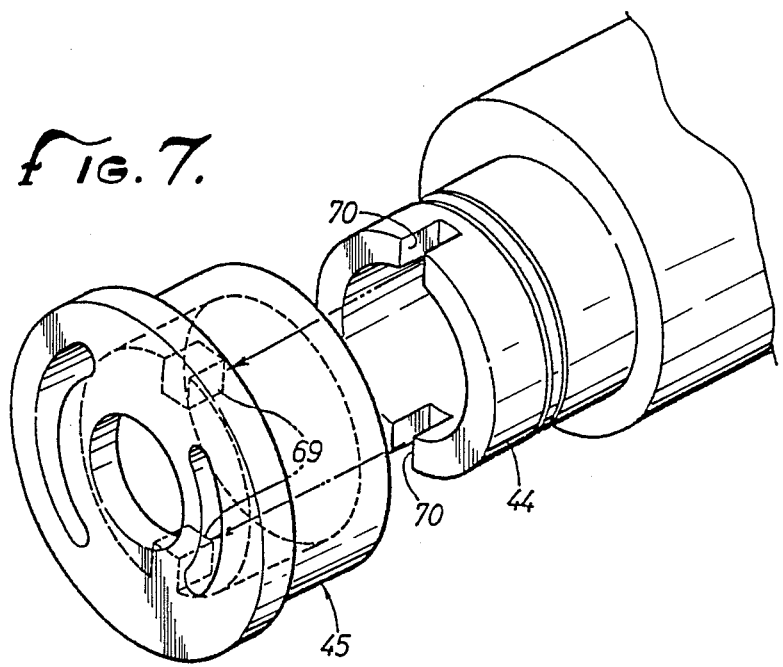

HYDRAULICALLY OPERATED CONTINUOUSLY VARIABLE TRANSMISSION

BACKGROUND OF THE INVENTION

The present invention relates to a hydraulically operated continuously variable transmissions including a hydraulic pump and a hydraulic motor which are interconnected by a closed hydraulic circuit.

There have been proposed various hydraulically operated continuously variable transmissions for use in automobiles, including a swash-plate axial-plunger hydraulic pump having a pump cylinder coupled to an input shaft and a plurality of pump plungers slidably disposed in respective cylinder holes defined in the pump cylinder in an annular pattern around an axis of rotation of the pump cylinder, the hydraulic pump having an outlet port, a swash-plate axial-plunger hydraulic motor having a motor cylinder coupled to an output shaft and a plurality of motor plungers slidably disposed in respective cylinder holes defined in the motor cylinder in an annular pattern around an axis of rotation of the motor cylinder, the hydraulic motor having an inlet port, and a closed hydraulic circuit interconnecting the hydraulic pump and the hydraulic motor. Power is transmitted by the transmission through relative rotation between the motor cylinder and the pump cylinder.

As disclosed in Japanese Patent Publications Nos. 32-7159 and 41-3208, for example, communication ports arranged at substantially equal angular intervals in communication with the respective cylinder holes in the motor cylinder are defined in the motor cylinder and open at an axial end face thereof in an annular pattern around the axis of rotation of the motor cylinder. An annular distribution ring is disposed eccentrically with respect to the axis of rotation of the motor cylinder and held in slidable contact with the end face of the motor cylinder. Oil discharged from the hydraulic pump is introduced into the distribution ring, whereas oil discharged from the motor cylinder is introduced around the distribution ring.

The outlet and inlet ports of the pump are brought into successive communication with the communication ports in the motor cylinder in response to relative rotation between the distribution ring and the motor cylinder for reciprocally moving the annularly arranged motor plungers.

Another known distribution ring has a suction port for introducing oil discharged from the pump into those cylinder holes which are in the expansion stroke and a discharge port for discharging oil from those cylinder holes which are in the contraction stroke, the suction and discharge ports being of an annular shape along the annular pattern of the communication ports. In this arrangement, the annularly arranged communication ports are successively brought into communication with the suction and discharge ports of the distribution ring in response to rotation of the motor cylinder for reciprocally moving the annularly arranged motor plungers while drawing in and discharging working oil.

The distribution ring in the above conventional arrangements is fitted in a fluid-tight manner over a fixed shaft mounted in a casing through a seal member such as an O-ring. When the motor cylinder rotates at high speed, the distribution ring tends to rotate therewith, bringing the ports out of registry or damaging the O-ring.

SUMMARY OF THE INVENTION

In view of the aforesaid drawback of the prior art, it is an object of the present invention to provide a hydraulically operated continuously variable transmission which prevents a distribution ring from rotating with a motor cylinder.

According to the present invention, the above object can be accomplished by a hydraulically operated continuously variable transmission comprising a transmission case, a fixed shaft mounted in the transmission case, an output shaft rotatably supported in the transmission case, a hydraulic motor coupled to the output shaft and having a motor cylinder and an annular array of slidable motor plungers disposed around an axis of rotation thereof and slidably disposed in respective cylinder holes defined in the motor cylinder, the hydraulic motor also having a distribution ring supported on the fixed shaft and rotatable relatively to and slidable against an end face of the motor cylinder for introducing high-pressure oil successively into the cylinder holes and discharging oil successively from the cylinder holes in response to rotation of the motor cylinder, an input shaft rotatably supported in the transmission case, a hydraulic pump coupled to the input shaft, at least one of the hydraulic pump and the hydraulic motor being of the variable-displacement type, a closed hydraulic circuit interconnecting the hydraulic pump and the hydraulic motor, and stop means holding the distribution ring in engagement with the fixed shaft for preventing the distribution ring from rotating with respect to the fixed shaft.

Since the distribution ring is prevented from being circumferentially displaced on the fixed shaft, the distribution ring does not rotate with the motor cylinder.

According to the present invention, there is also provided a hydraulically operated continuously variable transmission comprising a transmission case, a fixed shaft mounted in the transmission case, an output shaft rotatably supported in the transmission case, a hydraulic motor coupled to the output shaft and having a motor cylinder and an annular array of slidable motor plungers disposed around an axis of rotation thereof and slidably disposed in respective cylinder holes defined in the motor cylinder, the motor cylinder having an annular array of communication ports disposed around the axis of rotation and communicating with the cylinder holes, the communication ports opening at an end face of the motor cylinder, the hydraulic motor also having a distribution ring supported on the fixed shaft and rotatable relatively to and slidable against the end face of the motor cylinder, the distribution ring having a suction port for communicating with the communication ports corresponding to those motor plungers which are in an expansion stroke, and a discharge port for communicating with the communication ports corresponding to those motor plungers which are in a contraction stroke, the suction and discharge ports being accurate in shape and extending substantially along the annular array of communication ports, the distribution ring having recesses defined in a surface thereof held in slidable contact with the end face of the motor cylinder, the recesses being contiguous to opposite ends, respectively, of the suction and discharge ports, and having cross-sectional areas progressively varied along the annular array of communication ports, an input shaft rotatably supported in the transmission case, a hydraulic pump coupled to the input shaft, at least one of the hydraulic pump and the hydraulic motor being of the variable-displacement type, and a closed hydraulic circuit interconnecting the hydraulic pump and the hydraulic motor.

The recesses joined to the suction and discharge ports of the distribution ring are effective in smoothing changes or abrupt transitions in the oil pressure in the cylinder holes of the motor cylinder when oil is introduced into and discharged from the motor cylinder.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a view similar to FIG. 5, showing a distribution ring according to another embodiment of the present invention; and FIG. 7 is a view similar to FIG. 5, showing a distribution ring according to still another embodiment of the present invention.

DESCRIPTION OF THE PREFERRED EMBODIMENTS

Figure 1:
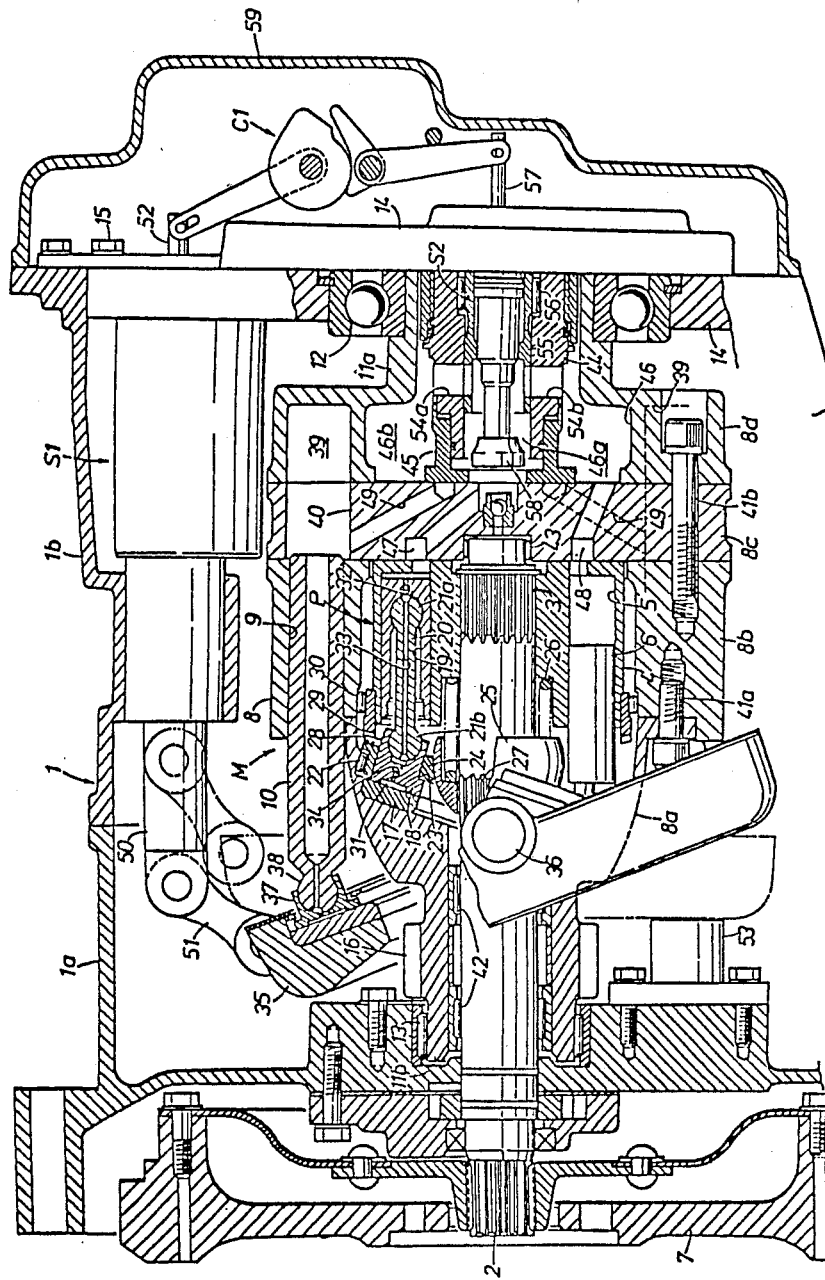
FIG. 1 is a longitudinal cross-sectional view of a hydraulically operated continuously variable transmission according to the present invention.

FIG. 1 shows a hydraulically operated continuously variable transmission for use in a motor vehicle such as an automobile according to the present invention, the transmission basically comprising a hydraulic pump P and a hydraulic motor M housed in a transmission case 1 composed of a pair of longitudinally separated case members 1a, 1b.

The hydraulic pump P has a pump cylinder 4 spliced to an end 3 of an input shaft 2, a plurality of cylinder holes or bores 5 defined in the pump cylinder 4 in a circular pattern around and concentric with the input shaft 2 and extending parallel to the input shaft 2, and a plurality of pump plungers 6 slidably fitted respectively in the cylinder holes 5. The hydraulic pump P can be driven by the power of an engine (not shown) which is transmitted through a flywheel 7 coupled to the opposite end of the input shaft 2.

The hydraulic motor M has a motor cylinder 8 disposed in surrounding relation to the pump cylinder 4, a plurality of cylinder holes or bores 9 defined in the motor cylinder 8 in a circular pattern around and concentric with the input shaft 2 and extending parallel to the input shaft 2, and a plurality of motor plungers 10 slidably fitted respectively in the cylinder holes 9. The hydraulic motor M is rotatable relatively to the pump cylinder 4 in concentric relation thereto.

The motor cylinder 8 has axially opposite ends on which a pair of support shafts 11a, 11b are disposed, respectively. The support shaft 11a is rotatably supported on the axial end wall of the case member 1b by means of a ball bearing 12, and the support shaft 11b is rotatably supported on the axial end wall of the case member 1a by means of a needle bearing 13. A holder plate 14 is fixed by bolts 15 to the axial end wall of the case member 1b. The ball bearing 12 and the support shaft 11a are thus fixedly mounted on the case member 1b against axial movement. The other support shaft 11b has an integral spur gear 16 for transmitting output power of the hydraulic motor M through a differential gear mechanism (not shown) to an outside member.

A pump swash plate 17 inclined at an angle to the pump plungers 6 is fixedly disposed radially inwardly of the motor cylinder 8. An annular pump shoe 18 is rotatably slidably supported on an inclined surface of the pump swash plate 17.

Each of the pump plungers 6 has a bottomed hole 19 opening toward the pump swash plate 17. A connecting rod 20 inserted in the bottomed hole 19 is pivotally movable with respect to the pump plunger 6 by means of a ball joint 21a on the inner end of the connecting rod 20. The connecting rod 20 projects out of the corresponding pump plunger 6 from the bottomed hole 19, and is pivotally movable with respect to the pump shoe 18 by means of a ball joint 21b on the outer projecting end of the connecting rod 20.

The annular pump shoe 18 has its outer peripheral surface supported in the motor cylinder 8 by a needle bearing 22. The annular pump shoe 18 has an annular step 23 defined in its inner peripheral surface facing the pump plungers 6. A presser ring 24 riding in the annular step 23 presses the pump shoe 18 toward the pump swash plate 17 under the resiliency of a compression coil spring 26 disposed under compression around the input shaft 2 and acting on a spring holder 25 held against the presser ring 24. The spring holder 25 is slidably fitted over splines 27 on the input shaft 2, and has a partly spherical surface contacting a complementary partly spherical surface of the presser ring 24. Therefore, the spring holder 25 is neatly held against the presser ring 24 for transmitting the resilient force from the spring 26 to the presser ring 24 irrespective of how the spring holder 25 and the presser ring 24 are relatively positioned.

Thus, the pump shoe 18 can be slidingly rotated in a fixed position on the pump swash plate 17 at all times.

The pump shoe 18 has a crown gear 28 on the end face thereof facing the pump cylinder 4, the crown gear 28 extending around the outer periphery of the pump shoe 18. A bevel gear 29, which has the same number of teeth as the crown gear 28, is fixed to the outer periphery of the pump cylinder 4, and held in mesh with the crown gear 28. When the pump cylinder 4 is driven to rotate by the input shaft 2, the pump shoe 18 is rotated in synchronism with the pump cylinder 4 through the meshing gears 28, 29. On rotation of the pump shoe 18, those pump plungers 6 which run along an ascending side of the inclined surface of the pump swash plate 17 are moved in a discharge stroke by the pump swash plate 17, the pump shoe 18, and the connecting rods 20, and those pump plungers 6 which travel along a descending side of the inclined surface of the pump swash plate 17 are moved in a suction stroke.

A needle bearing 30 is disposed between the outer peripheral surface of the bevel gear 29 and the inner peripheral surface of the motor cylinder 8. Therefore, concentric relative rotation of the pump cylinder 4 and the motor cylinder 8 is performed with increased accuracy.

The pump shoe 18 has hydraulic pockets 31 defined in its surface held against the pump swash plate 17 and positioned in alignment with the respective connecting rods 20. The hydraulic pockets 31 communicate with the respective oil chambers in the pump cylinder 4 through oil holes 32 defined in the pump plungers 6, oil holes 33 defined in the connecting rods 20, and oil holes 34 defined in the pump shoe 18. While the pump cylinder 4 is in operation, therefore, oil under pressure in the pump cylinder 4 is supplied to the hydraulic pockets 31 to apply a hydraulic pressure to the pump shoe 18 in a direction to bear the thrust force imposed by the pump plungers 6 on the pump shoe 18. Therefore, the oil supplied to the hydraulic pockets 31 serves to reduce the pressure under which the pump shoe 19 contacts the pump swash plate 17, and also to lubricate the mutually sliding surfaces of the pump shoe 18 and the pump swash plate 17.

A motor swash plate 35 is tiltably supported in the transmission case 1 by means of a pair of trunnions 36 projecting from opposite sides of the motor swash plate 35, which is held in confronting relation to the motor plungers 10. The motor swash plate 35 has an inclined surface on which there is slidably disposed a motor shoe 37 that is pivotally coupled to ball joints 38 on the outer ends of the motor plungers 10.

Each of the motor plungers 10 reciprocally moves in expansion and compression strokes while rotating the motor cylinder 8. The stroke of the motor plungers 10 can continuously be adjusted from zero to a maximum level by varying the angle of inclination of the motor swash plate 35 from a vertical position (shown by the two-dot-dash lines) in which the motor swash plate 35 lies perpendicularly to the motor plungers 10 to a most inclined position (shown by the solid lines).

The motor cylinder 8 comprises axially separate first through fourth members or segments 8a through 8d. The first member 8a includes the support shaft 11b and accommodates the pump swash plate 17. The second member 8b has guide holes in the cylinder holes 9, in which the motor plungers 10 are slidably guided, respectively. The third and fourth members 8c, 8d have oil chambers 39 in the cylinder holes 9, the oil chambers 39 being slightly larger in diameter than the guide holes in the cylinder holes 9. The third member 8c serves as a distribution member 40 having oil passages leading to the cylinder holes 5, 9, and the fourth member 8d includes the support shaft 11a. The first through fourth members 8a-8d are relatively positioned by knock pins, for example, inserted in their mating end faces, and are firmly coupled together by means of a plurality of bolts 41a, 41b.

The input shaft 2 has an outer end portion rotatably supported centrally in the support shaft 11b of the motor cylinder 8 by a needle bearing 42, and an inner end portion rotatably supported centrally in the distribution member 40 by a needle bearing 43.

The spring 26 is disposed under compression between the pump cylinder 4 and the spring holder 25 for pressing the pump cylinder 4 against the distribution member 40 to prevent oil from leaking from between the sliding surfaces of the pump cylinder 4 and the distribution member 40. The resilient force of the spring 26 is also effective in supporting the spring holder 25, the presser ring 24, the pump shoe 18, and the pump swash plate 17 firmly in the motor cylinder 8, as described above.

The support shaft 11a is of a hollow structure in which a fixed shaft 44 is centrally inserted. A distribution ring 45 is fitted over the inner end of the fixed shaft 44 in a fluid-tight manner through an O-ring therebetween. The distribution ring 45 has an axial end face held in sliding contact with the distribution member 40. The fourth member 8d of the motor cylinder 8 has an interior hollow space 46 which is divided by the distribution ring 45 into an inner oil chamber 46a and an outer oil chamber 46b.

The distribution member 40 has an outlet port 47 and an inlet port 48. The outlet port 47 provides fluid communication between the cylinder holes 5 that receive the pump plungers 6 operating in the discharge stroke and the inner oil chamber 46a. The inlet port 48 provides fluid communication between the cylinder holes 5 that receive the pump plungers 6 operating in the suction stroke and the outer oil chamber 46b. The distribution member 40 also has a number of communication ports 49 defined therein and through which the cylinder holes 9 of the motor cylinder 8 communicate with the interior space 46 in the fourth member 8d.

The communication ports 49 open into the interior space 46 at equally spaced locations on a circle around the axis of rotation of the hydraulic motor M. In response to rotation of the motor cylinder 8, the communication ports 49 are caused by the distribution ring 46 slidingly held against the distribution member 40 to successively communicate with the inner and outer oil chambers 46a, 46b.

Therefore, a closed hydraulic circuit is formed between the hydraulic pump P and the hydraulic motor M through the distribution member 40 and the distribution ring 45. When the pump cylinder 4 is driven by the input shaft 2, high-pressure working oil discharged by the pump plungers 6 in the discharge stroke flows from the outlet port 47, the inner oil chamber 46a, and the communication ports 49 communicating with the inner oil chamber 46a into the cylinder holes 9 receiving the motor plungers 10 which are in the expansion stroke, thereby imposing a thrust on these motor plungers 10.

Working oil discharged by the motor plungers 10 operating in the compression stroke flows through the communication ports 49 communicating with the outer oil chamber 46b and the inlet port 48 into the cylinder holes 5 receiving the pump plungers 6 in the suction stroke. Upon such circulation of the working oil, the motor cylinder 8 is driven by the sum of the reactive torque applied by the pump plungers 6 in the discharge stroke to the motor cylinder 8 through the pump swash plate 17 and the reactive torque received by the motor plungers 10 in the expansion stroke from the motor swash plate 35.

The transmission ratio of the motor cylinder 8 to the pump cylinder 4 is given by the following equation:

$$\text{Transmission ratio} = \frac{\text{Rotational speed of pump cylinder 4}}{\text{Rotational speed of motor cylinder 8}} = 1 + \frac{\text{Displacement of hydraulic motor } M}{\text{Displacement of hydraulic pump } P}$$

It can be understood from the above equation that the transmission ratio can be varied from 1 to a desired value by varying the displacement of the hydraulic motor M from zero to a certain value.

Since the displacement of the hydraulic motor M is determined by the stroke of the motor plungers 10, the transmission ratio can continuously be adjusted from 1 to a certain value by tilting the motor swash plate 35 from the vertical position to a certain inclined position.

A hydraulic ratio-changing servomotor S1 for tilting the motor swash plate 35 is disposed in an upper portion of the transmission case 1. The ratio-changing servomotor S1 has a piston rod 50 having an end projecting into the transmission case 1. The projecting end of the piston rod 50 is coupled to the motor swash plate 35 through a connector 51 and pivot pins. The servomotor S1 has a pilot valve 52, and the outer end of the pilot valve 52 projecting through the holder plate 14 is coupled to a cam mechanism C1. The motor swash plate 35 is remotely controlled by a control device (not shown) through the servomotor S1 and the cam mechanism C1.

The ratio-changing servomotor S1 is of the known type in which a piston therein is reciprocally operated in amplified movement by following the movement of the pilot valve 52 which is given by the control device. In response to operation of the servomotor S1, the motor swash plate 35 can continuously be angularly shifted or adjusted from the most inclined position indicated by the solid lines in FIG. 1 where the transmission ratio is maximum to the least inclined position indicated by the imaginary (two-dot-and-dash) lines where the transmission ratio is minimum.

A stopper 53 is interposed between the motor swash plate 35 and the end wall of the case member 1a for limiting the mechanical least inclined position of the motor swash plate 35.

The fixed shaft 44 is of a hollow construction having a peripheral wall having radial connecting ports 54a, 54b through which the inner and outer oil chambers 46a, 46b communicate with each other. A cylindrical clutch valve 55 is fitted in the interior space of the fixed shaft 44 for selectively opening and closing the ports 54a, 54b, the clutch valve 55 being rotatable relatively to the fixed shaft 44 through a needle bearing 56. The clutch valve 55 serves as a clutch for selectively connecting and disconnecting the hydraulic pump P and the hydraulic motor M. The clutch valve 55 is operatively coupled to a clutch control unit (not shown). When the ports 54a, 54b are fully opened, the clutch is in an "OFF" position. When the ports 54a, 54b are partly opened, the clutch is in a "partly ON" position. When the ports 54a, 54b are fully closed, the clutch is in an "ON" position. With the clutch OFF as shown, working oil discharged from the outlet port 47 into the inner oil chamber 46a flows through the ports 54a, 54b and the outer oil chamber 46b directly into the inlet port 48, making the hydraulic motor M inoperative. When the clutch is ON, the above oil flow is shut off, and working oil is circulated from the hydraulic pump P to the hydraulic motor M, allowing hydraulic power to be transmitted from the hydraulic pump P to the hydraulic motor M.

A servomotor S2 for selectively making and breaking the hydraulic circuit is disposed centrally in the hollow clutch valve 55. The servomotor S2 is operatively coupled to the ratio-changing servomotor S1 through the cam mechanism C1. When a pilot valve 57 of the servomotor S2 which projects out from the holder plate 14 is pushed, a shoe 58 on the distal end of the servomotor S2 closes the open end of the outlet port 47 in the distribution member 40 thereby cutting off the flow of working oil from the outlet port 47 into the inner oil chamber 46a.

With the oil flow thus cut off, the pump plungers 6 are hydraulically locked, and the hydraulic pump P and the hydraulic motor M are directly connected to each other, so that the motor cylinder 8 can mechanically be driven by the pump cylinder 4 through the pump plungers 6 and the pump swash plate 17. The hydraulic pump P and the hydraulic motor M are directly interconnected in this manner when the motor swash plate 35 is vertically positioned for the minimum transmission ratio. In this transmission position, the efficiency of transmission of power from the input shaft to the output shaft is increased, and the thrust applied by the motor plungers 10 to the motor swash plate 35 is reduced, thus lessening the stresses on the bearings and other members.

The cam mechanism C1, the holder plate 14, and other members are covered with an end cover 59 attached to the right end of the transmission case 1, as shown in FIG. 1.

Figure 2:
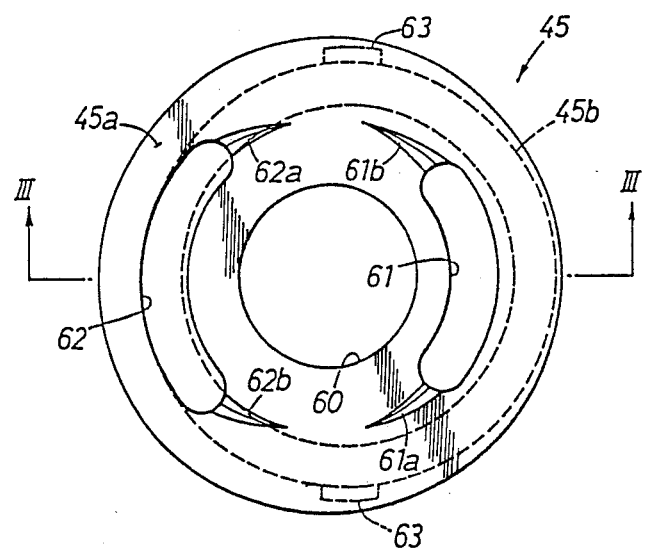
FIG. 2 is an end view of a distribution ring.
Figure 3:
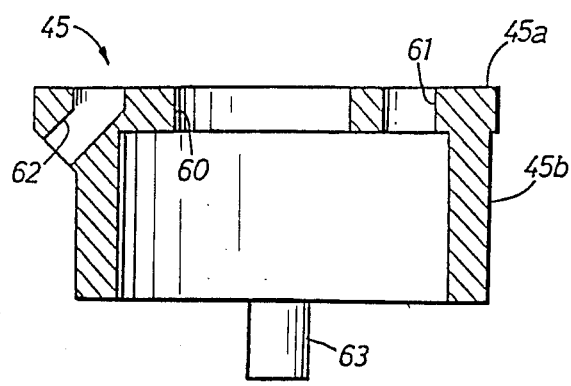
FIG. 3 is a cross-sectional view taken along line III-—III of FIG. 2.

As shown in FIGS. 2 and 3, the distribution ring 45 comprises a disc portion 45a held in slidable contact with the end face of the distribution member 40, and a cylindrical portion 45b receiving the free end of the fixed shaft 44. The disc portion 45a has defined therein a central hole 60 communicating with the outlet port 47 of the hydraulic pump P and through which the shoe 58 of the servomotor S2 can be inserted, a suction port 61 providing communication between the end face of the disc portion 45a which is held in slidable contact with the distribution member 40 and the interior of the cylindrical portion 45b, and a discharge port 62 providing communication between the end face of the disc portion 45a which is held in slidable contact with the distribution member 40 and the exterior of the cylindrical portion 45b.

Figure 4:
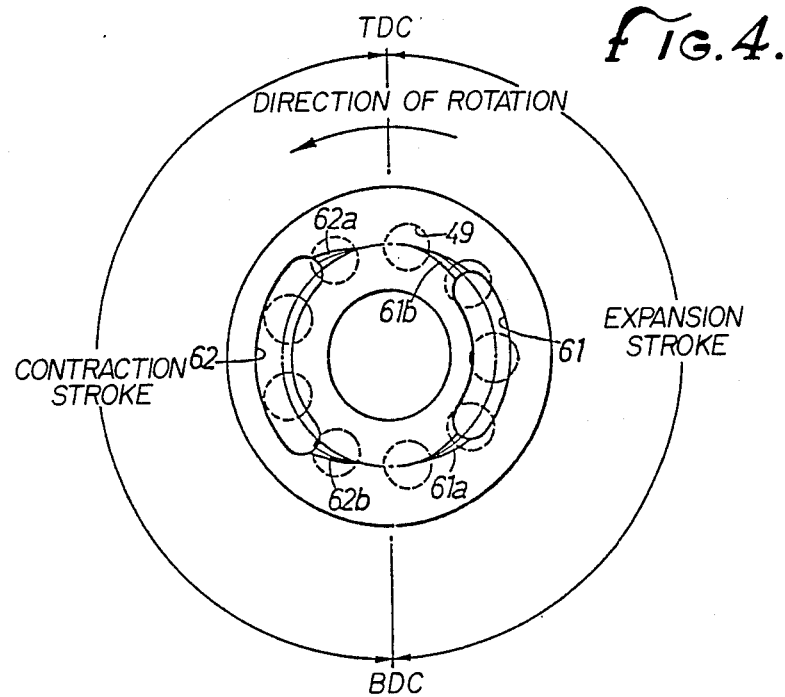
FIG. 4 is a schematic view showing the relationship between the distribution ring and communication ports.

The suction port 61 communicates the inner oil chamber 46a with the communication ports 49 corresponding to those cylinder holes in the expansion stroke, whereas the discharge port 62 communicates the outer oil chamber 46b with the communication ports 49 corresponding to those cylinder holes in the contraction stroke. As shown in FIG. 4, the ports 61, 62 are accurate in shape and extend substantially along the pitch circle of the annular pattern of the communication ports 49 so that the ports 61, 62 can communicate with plural communication ports 49 simultaneously. Recesses 61a through 62b are defined in the end face of the disc portion 45a which slides against the distribution member 40. The recesses 61a through 62b are contiguous to the opposite ends of the ports 61, 62 and have their cross-sectional area progressively reduced in directions along the pitch circle away from the ports 61, 62.

The high-pressure oil which is discharged by the pump plungers 6 in the discharge stroke to flow from the discharge port 47 into the inner oil chamber 46a flows via the suction port 61 and those communication ports 49 which are in registry with the suction port 61 into the cylinder holes 9 of the hydraulic motor M. At this time, as shown in FIG. 4, the communication ports 49 as they rotate are registered alternately with the suction and discharge ports 61, 62. Those communication ports 49 which communicate with the motor plungers 10 that start to move in the expansion stroke are gradually supplied with high-pressure oil from the recess 61a located upstream in the direction of rotation. As the motor plungers 10 are successively moved out of the expansion stroke, the supply of high-pressure oil is gradually cut off from the downstream recess 61b. When the motor plungers 10 enter the contraction stroke, oil is gradually discharged from the upstream recess 62a, and when the motor plungers 10 are moved out of the contraction stroke, the discharge of oil is gradually stopped from the downstream recess 62b. Therefore, the recesses 61a through 62b are effective to smooth out abrupt changes in the oil pressure in the cylinder holes 9 of the motor cylinder 8 when oil is introduced into and discharged from the motor cylinder 8.

If the suction and discharge ports 61, 62 were circumferentially displaced, the motor plungers 10 would not be operated appropriately. To avoid this problem, the distribution ring 45 should be angularly positioned with respect to the fixed shaft 44. According to the present invention, stop means is provided between the distribution ring 45 and the fixed shaft 44 for preventing the distribution ring 45 and the fixed shaft 44 from being circumferentially displaced with respect to each other.

Figure 5:
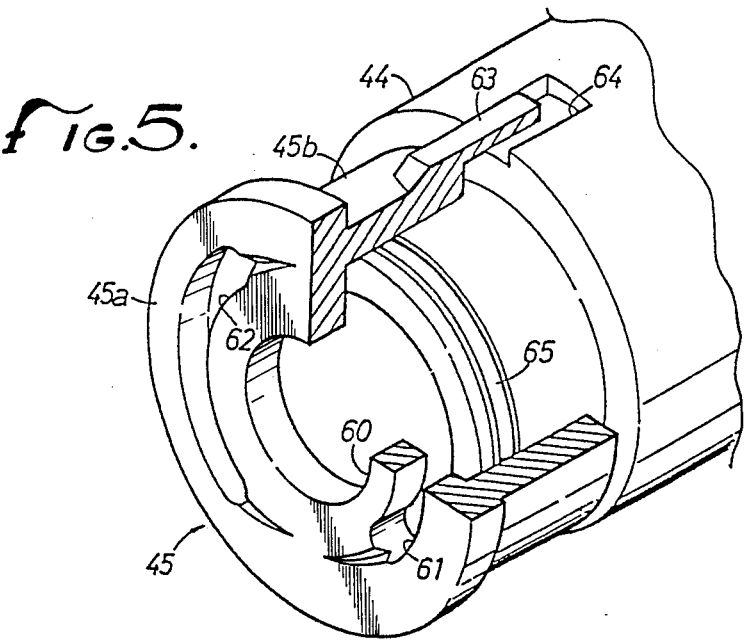
FIG. 5 is a fragmentary perspective view, partly cut away, of the distribution ring which is mounted on a fixed shaft.

More specifically, as shown in FIG. 5, a pair of diametrically opposite fingers 63 projects axially from the end of the cylindrical portion 45b of the distribution ring 45 remotely from the disc portion 45a and is disposed on the outer circumference of the cylindrical portion 45b. The outer circumferential surface of the fixed shaft 45 has a pair of diametrically opposite recesses 64 defined therein and receiving the fingers 63, respectively. With the fingers 63 engaging in the corresponding recesses 64, the cylindrical portion 45b is fitted in a fluid-tight manner over the axial end of the fixed shaft 44 with a seal member 65 such as an O-ring therebetween. Thus, the distribution ring 45 and the fixed shaft 44 are prevented from being relatively angularly displaced by the fingers 63 received in the recesses 64.

FIG. 6 shows another embodiment according to the present invention. The fixed shaft 44 has on its free end an insertion member 66 comprising a larger-diameter portion 66a and a smaller-diameter portion 66b which have radially offset or eccentric axes, respectively, and are of successively smaller diameters. The larger-diameter portion 66a and the smaller-diameter portion 66b are axially successively formed integrally with the axial end of the fixed shaft 44, with seal members 67a, 67b fitted respectively over the larger-diameter portion 66a and the smaller-diameter portion 66b.

The cylindrical portion 45b of the distribution ring 45 has a receiving hole 68 defined therein and shaped complimentarily to the insertion member 66 for snugly receiving the same therein. By inserting the insertion member 66 into the receiving hole 68 with the seal members 67a, 67b interposed therebetween, the fixed shaft 44 and the distribution ring 45 are prevented from being angularly moved with respect to each other.

According to still another embodiment shown in FIG. 7, the distribution ring 45 and the fixed shaft 44 are prevented from being relatively angularly moved by a pair of diametrically opposite teeth 69 on the inner circumferential surface of the distribution ring 45 and a pair of diametrically opposite recesses 70 defined in the distal free end of the fixed shaft 44 and receiving the teeth 69, respectively.

In the embodiments shown in FIGS. 6 and 7, the distribution ring 45 is axially movable on the fixed shaft 44 into intimate contact with the distribution member 40.

With the present invention, as described above, the distribution ring is prevented from rotation with the distribution member by quite a simple structure which can easily be assembled. Therefore, the O-rings or seal members used in the distribution ring remain highly durable for a long period of time. The ports of the distribution rings are kept in proper positional relationship to the communication ports without undesirable positional deviation or misalignment. As a consequence, operational reliability of the transmission is increased.

Although certain preferred embodiments have been shown and described, it should be understood that many changes and modifications may be made therein without departing from the scope of the appended claims.

What is claimed is:

1. A hydraulically operated continuously variable transmission comprising:
   a transmission case;
   a fixed shaft mounted in said transmission case;
   an output shaft rotatably supported in said transmission case;
   a hydraulic motor coupled to said output shaft and having a motor cylinder and an annular array of slidable motor plungers disposed around an axis of rotation thereof and slidably disposed in respective cylinder holes defined in said motor cylinder, said hydraulic motor also having a distribution ring supported on said fixed shaft and rotatable relatively to and slidable against an end face of said motor cylinder for introducing high-pressure oil successively into said cylinder holes and discharging oil successively from said cylinder holes in response to rotation of said motor cylinder;
   an input shaft rotatably supported in said transmission case;
   a hydraulic pump coupled to said input shaft, at least one of said hydraulic pump and said hydraulic motor being of the variable-displacement type;
   a closed hydraulic circuit interconnecting said hydraulic pump and said hydraulic motor; and
   stop means holding said distribution ring in engagement with said fixed shaft for preventing said distribution ring from rotating with respect to said fixed shaft.

2. A hydraulically operated continuously variable transmission according to claim 1, wherein said stop means comprises at least one recess defined in one of said fixed shaft and said distribution ring and at least one projection on the other of said fixed shaft and said distribution ring, said projection complementary engaging in said recess.

3. A hydraulically operated continuously variable transmission comprising:
   a transmission case;
   a fixed shaft mounted in said transmission case;
   an output shaft rotatably supported in said transmission case;
   a hydraulic motor coupled to said output shaft and having a motor cylinder and an annular array of slidable motor plungers disposed around an axis of rotation thereof and slidably disposed in respective cylinder holes defined in said motor cylinder, said hydraulic motor also having a distribution ring supported on said fixed shaft and rotatable relatively to and slidable against an end face of said motor cylinder for introducing high-pressure oil successively from said cylinder holes in response to rotation of said motor cylinder;
   an input shaft rotatably supported in said transmission case;

a hydraulic pump coupled to said input shaft, at least one of said hydraulic pump and said hydraulic motor being of the variable-displacement type;

a closed hydraulic circuit interconnecting said hydraulic pump and said hydraulic motor; and stop means holding said distribution ring in engagement with said fixed shaft for preventing said distribution ring from rotating with respect to said fixed shaft, said stop means comprising at least one recess defined in one of said fixed shaft and said distribution ring and at least one projection on the other of said fixed shaft and said distribution ring, said projection complementary engaging in said recess, wherein further said stop means comprises a pair of diametrically opposite recesses on an outer circumferential surface of said fixed shaft and a pair of diametrically opposite fingers on an outer circumferential surface of said distribution ring, said fingers engaging in said recesses, respectively.

4. A hydraulically operated continuously variable transmission comprising:

a transmission case;

a fixed shaft mounted in said transmission case;

an output shaft rotatably supported in said transmission case;

a hydraulic motor coupled to said output shaft and having a motor cylinder and an annular array of slidable motor plungers disposed around an axis of rotation thereof and slidably disposed in respective cylinder holes defined in said motor cylinder, said hydraulic motor also having a distribution ring supported on said fixed shaft and rotatable relatively to an slidable against an end face of said motor cylinder for introducing high-pressure oil successively from said cylinder holes in response to rotation of said motor cylinder;

an input shaft rotatably supported in said transmission case;

a hydraulic pump coupled to said input shaft, at least one of said hydraulic pump and said hydraulic motor being of the variable-displacement types;

a closed hydraulic circuit interconnecting said hydraulic pump and said hydraulic motor; and stop means holding said distribution ring in engagement with said fixed shaft for preventing said distribution ring from rotating with respect to said fixed shaft, said stop means comprising at least one recess defined in one of said fixed shaft and said distribution ring and at least one projection on the other of said fixed shaft and said distribution ring, said projection complementarily engaging in said recess, wherein further said stop means comprises a pair of diametrically opposite recesses on an axial end of said fixed shaft and a pair of diametrically opposite teeth on an inner circumferential surface of said distribution ring, said teeth engaging in said recesses, respectively.

5. A hydraulically operated continuously variable transmission comprising:

a transmission case;

a fixed shaft mounted in said transmission case;

an output shaft rotatably supported in said transmission case;

a hydraulic motor coupled to said output shaft and having a motor cylinder and an annular array of slidable motor plungers disposed around an axis of rotation thereof and slidably disposed in respective cylinder holes defined in said motor cylinder, said fixed shaft and rotatable relatively to and slidable against an end face of said motor cylinder for introducing high-pressure oil successively into said cylinder holes and discharging oil successively from said cylinder holes in response to rotation of said motor cylinder;

an input shaft rotatably supported in said transmission case;

a hydraulic pump coupled to said input shaft, at least one of said hydraulic pump and said hydraulic motor being of the variable-displacement type;

a closed hydraulic circuit interconnecting said hydraulic pump and said hydraulic motor; and stop means holding said distribution ring in engagement with said fixed shaft for preventing said distribution ring from rotating with respect to said fixed shaft, said stop means comprising an insertion member on an axial end of said fixed shaft, said insertion member including a plurality of mutually eccentric portions having different diameters, and a receiving hole defined in said distribution ring and snugly receiving said insertion member in complementary relation thereto.

6. A hydraulically operated continuously variable transmission comprising:

a transmission case;

a fixed shaft mounted in said transmission case;

an output shaft rotatably supported in said transmission case;

a hydraulic motor coupled to said output shaft and having a motor cylinder and an annular array of slidable motor plungers disposed around an axis of rotation thereof and slidably disposed in respective cylinder holes defined in said motor cylinder, said motor cylinder having an annular array of communicative ports disposed around said axis of rotation and communicating with said cylinder holes, said communication ports opening at an end face of said motor cylinder, said hydraulic motor also having a distribution ring supported on said fixed shaft and rotatable relatively to an slidable against said end face of said motor cylinder, said distribution ring having a suction port for communicating with the communication ports corresponding to those motor plungers which are in an expansion stroke, and a discharge port for communicating with the communication ports corresponding to those motor plungers which are in a contraction stroke, said suction and discharge ports being accurate in shape and extending substantially along said annular array of communication ports, said distribution ring having recesses defined in a surface thereof held in slidable contact with said end face of the motor cylinder, said recesses being contiguous to opposite ends, respectively, of said suction and discharge ports, and having cross-sectional areas progressively varied along said annular array of communication ports;

an input shaft rotatably supported in said transmission case;

a hydraulic pump coupled to said input shaft, at least one of said hydraulic pump and said hydraulic motor being of the variable-displacement type;

a closed hydraulic circuit interconnecting said hydraulic pump and said hydraulic motor; and stop means holding said distribution ring in engagement with said fixed shaft for preventing said distribution ring from rotating with respect to said fixed shaft.

7. A hydraulically operated continuously variable transmission according to claim 6, wherein said cross-sectional areas are progressively smaller in directions away from said suction and discharge ports.

8. A fluid distribution apparatus in an hydraulically operated continuously variable transmission of the type having a hydraulic pump and a hydraulic motor, a closed hydraulic circuit connecting said hydraulic pump and said hydraulic motor, and distribution member forming part of said closed hydraulic circuit, comprising:
- a distribution ring with a face for slidable engagement against said distribution member, said distribution ring being mounted to a fixed shaft and rotatable relative to and slidable against said distribution member, said distribution ring having a cylindrical portion cooperating with said fixed shaft to form an interior of said distribution ring and an exterior of said distribution ring,
- a first accurate port in said distribution ring opening from said face of said distribution ring into the interior of said distribution ring,
- a second accurate port in said distribution ring opening from said face of said distribution ring to the exterior of said distribution ring,
- recesses defined in said face of said distribution ring, said recesses being contiguous to opposite ends, respectively, of said first and second accurate ports and having cross-sectional areas progressively varied along arcs described by said first and second accurate ports, and
- stop means holding said distribution ring in engagement with said fixed shaft for preventing said distribution ring from rotating with respect to said fixed shaft.

9. A fluid distribution apparatus according to claim 8, wherein said cross-sectional areas are progressively smaller in directions away from said first and second accurate ports.

10. A fluid distribution apparatus in an hydraulically operated continuously variable transmission of the type having a hydraulic pump and a hydraulic motor, a closed hydraulic circuit connecting said hydraulic pump and said hydraulic motor, and a distribution member forming part of said closed hydraulic circuit, comprising:
- a distribution ring with a face for slidable engagement against said distribution member, said distribution ring being mounted to a fixed shaft and rotatable relative to and slidable against said distribution member,
- stop means holding said distribution ring in engagement with said fixed shaft for preventing said distribution ring from rotating with respect to said fixed shaft.

11. A fluid distribution apparatus according to claim 10, wherein said stop means comprises at least one recess defined in one of said fixed shaft and said distribution ring and at least one projection on the other end of said fixed shaft and said distribution ring, said projection complimentarily engaging in said recess.

12. A fluid distribution apparatus according to claim 10, wherein said stop means comprises a pair of diametrically opposite recesses on an outer circumferential surface of said fixed shaft and a pair of diametrically opposite fingers on an outer circumferential surface of said distribution ring, said fingers engaging in said recesses, respectively.

* * * * *

UNITED STATES PATENT AND TRADEMARK OFFICE
CERTIFICATE OF CORRECTION

PATENT NO. : 4,891,944

DATED : January 9, 1990

INVENTOR(S) : Okuda et al.

It is certified that error appears in the above-identified patent and that said Letters Patent is hereby corrected as shown below:

Column 12, line 38, change "communicative" to --communication--
Column 13, claim 8, line 24 change "accurate" to --arcuate--.
Column 13, claim 8, line 27 change "accurate" to --arcuate--.
Column 13, claim 8, line 32 change "accurate" to --arcuate--.

Signed and Sealed this

Twenty-sixth Day of March, 1991

Attest:

HARRY F. MANBECK, JR.

*Attesting Officer*     *Commissioner of Patents and Trademarks*